United States Patent [19]
Kusakawa

[11] Patent Number: 5,315,702
[45] Date of Patent: May 24, 1994

[54] TERMINAL APPARATUS WITH TRANSMISSION FUNCTION

[75] Inventor: Mari Kusakawa, Tokyo, Japan

[73] Assignee: Fujitsu Limited, Kawasaki, Japan

[21] Appl. No.: 407,945

[22] Filed: Sep. 14, 1989

[30] Foreign Application Priority Data

Sep. 14, 1988 [JP] Japan .................. 63-230734

[51] Int. Cl.[5] .................. G06F 15/20; G06F 15/66
[52] U.S. Cl. .................. 395/164; 395/162; 358/524
[58] Field of Search ............. 364/518, 521, 522, 514; 340/747, 750, 703; 395/129, 131, 162, 164, 165, 166; 358/78

[56] References Cited

U.S. PATENT DOCUMENTS

| | | | |
|---|---|---|---|
| 4,491,873 | 1/1985 | Takayama | 358/256 |
| 4,587,557 | 5/1986 | Sugiyama et al. | 358/160 |
| 4,721,951 | 1/1988 | Holler | 340/701 |
| 4,763,291 | 8/1988 | Schwaber | 364/704 |
| 4,881,181 | 11/1989 | Jeschke et al. | 364/519 |

*Primary Examiner*—Phu K. Nguyen
*Attorney, Agent, or Firm*—Staas & Halsey

[57] ABSTRACT

In a terminal apparatus for displaying a natural image on a display unit and sending the natural image to another terminal apparatus, the terminal apparatus includes: only one storage unit provided in common for storing RGB data, luminance/color difference data and compression data, the RGB data, and compression data being obtained by compressing the luminance/color difference data under a predetermined method; a switching unit operatively connected to the storage unit for switching content of display on the display unit from the RGB data stored in the storage unit to other image data not stored in the storage unit when the RGB data is converted to the luminance/color difference data and the luminance/color difference data is converted to the compression data; and a control unit operatively connected to the storage unit, switching unit and transmission unit through bus lines for reading out the RGB data from the storage unit, converting the RGB data to the luminance/color difference data, storing the luminance/color difference data into the storage unit, and compressing the luminance/color difference data to the compression data after read out from the storage unit, further, for controlling switching operation of the switching unit.

8 Claims, 9 Drawing Sheets

TERMINAL APPARATUS WITH TRANSMISSION FUNCTION

BACKGROUND OF THE INVENTION

1. Field of the Invention

The present invention relates to a terminal apparatus with a transmission function for sending image data to another terminal apparatus, more particularly, it relates to an improvement of a terminal apparatus provided in, for example, a personal computer, which can send a natural image, such as a photo, to another terminal apparatus.

2. Description of the Related Art

Recently, communication between personal computers is widely utilized in digital communication networks, for example, an ISDN (Integrated Services Digital Network). Some types of personal computers can send natural images to another personal computer. This transmission function is very useful in the utilization of the ISDN since it is possible to directly send a photo, such as a sales catalog, to a user. Further, this transmission function which makes it possible to send natural pictures is useful, for example, in a teleconference system since it is possible to display a photo as a data display.

In general, such a terminal apparatus comprises a transmission means for sending the image data to another terminal, at least two storage means for storing the image data to be transmitted, a display means for displaying the image data to be transmitted and for confirming the content of the image data, and a control means for controlling the storage and transmission of the image data.

As a basic operation, input image data scanned from the natural image is stored in the storage means as RGB (red, green, blue) data, and the RGB data is displayed on the display means to confirm whether or not it is correct as the image data to be transmitted. Further, the RGB data is converted to luminance/color difference data. The luminance/color difference data is compressed and stored in the storage means, and the transmission means then sends the compression data to another terminal apparatus.

However, there is problem with the storage means in view of effective utilization of memory capacity as explained hereinafter.

SUMMARY OF THE INVENTION

The object of the present invention is to provide a terminal apparatus with a transmission function for sending image data to another terminal apparatus, and enabling reduction of memory capacity.

In accordance with the present invention, there is provided a terminal apparatus for displaying a natural image on a display unit and sending the natural image to another terminal apparatus, including only one storage unit provided in common for storing RGB data, luminance/color difference data and compression data, the RGB data being obtained by scanning the natural image, the luminance/color difference data being obtained by converting the RGB data, and compression data being obtained by compressing the luminance/color difference data under a predetermined method; a switching unit operatively connected to the storage unit for switching content of display on the display unit from the RGB data stored in the storage unit to other image data not stored in the storage unit when the RGB data is converted to the luminance/color difference data and the luminance/color difference data is converted to the compression data; and a control unit operatively connected to the storage unit, switching unit and transmission unit through bus lines for reading out the RGB data from the storage unit, converting the RGB data to the luminance/color difference data, storing the luminance/color difference data into the storage unit, and compressing the luminance/color difference data to the compression data after read out from the storage unit, further, for controlling switching operation of the switching unit.

DESCRIPTION OF THE PREFERRED EMBODIMENTS

Before describing the preferred embodiments, an explanation will be given of a conventional terminal apparatus with a transmission function.

Figure 1:
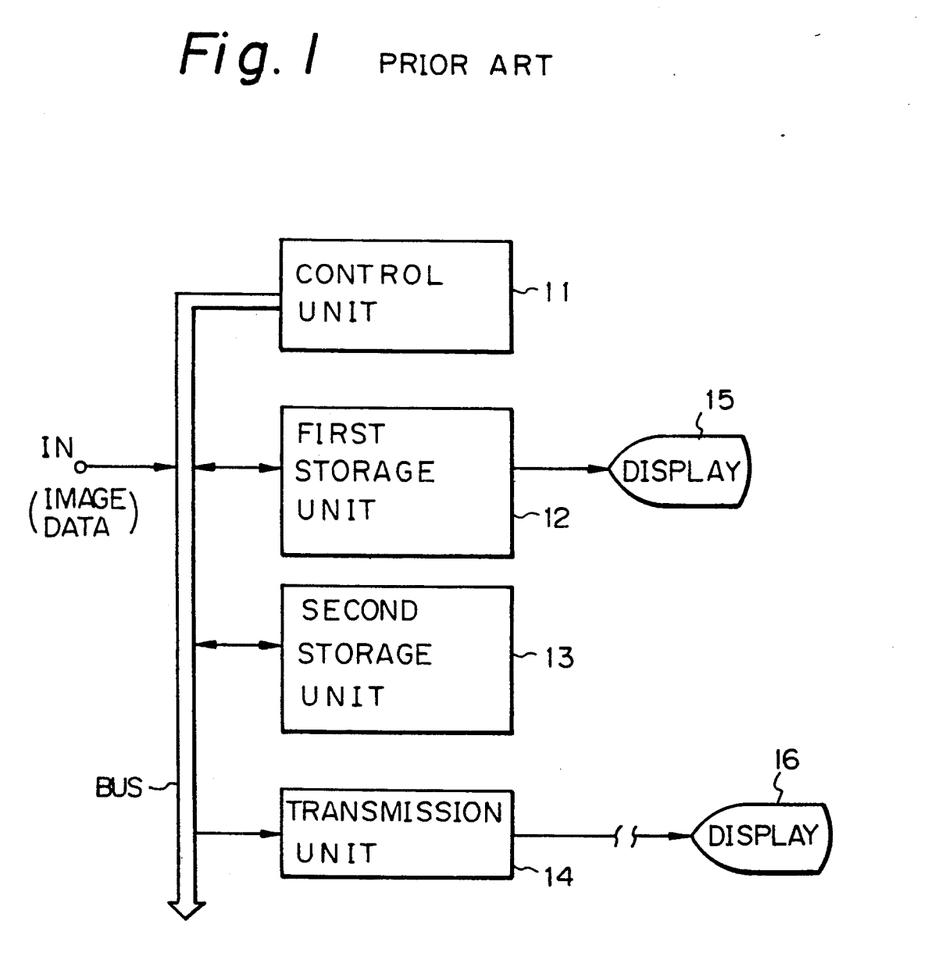
FIG. 1 is a schematic block diagram of a conventional terminal apparatus with a transmission function.

FIG. 1 is a schematic block diagram of a conventional terminal apparatus with a transmission function. In FIG. 1, reference number 11 denotes a control unit, 12 a first storage unit, 13 a second control unit, 14 a transmission unit, and 15 a display unit. Reference number 16 also denotes a display unit, but this display unit 16 is provided to another terminal apparatus on a reception side. Accordingly, the terminal apparatus on the transmission side is constituted by the units 11 to 15.

The image data desired from the reception side is read out from a color scanner or an external storage device and stored in the first storage unit 12 as RGB data. The RGB data is displayed on the display unit 15 to confirm the content thereof, and the RGB data is converted to luminance/color difference data. The luminance/color difference data is compressed to raise the transmission efficiency and is stored in the second storage unit 13 under the control of the control unit 11. Accordingly, the RGB data is stored in the first storage unit 12 and the compression data obtained from the luminance/color difference data is stored in the second storage unit 13. The compression data is transmitted to the display unit 16 on the reception side through the transmission unit 14. In this case, the image data is also displayed on the display unit 15 during transmission to another terminal apparatus.

As is obvious from the drawing, two storage units 12 and 13 are independently provided for storing the RGB data and the compression data obtained from the luminance/color difference data, respectively. Accordingly, a large memory capacity is necessary for storing these data. Particularly, the RGB data and the luminance/color difference data for the natural image necessitates large memory capacity because for storing color information.

A terminal apparatus with a transmission function for displaying the natural image and sending the natural image to another terminal apparatus will be explained in detail hereinafter. A terminal apparatus with a transmission function is provided for, for example, a personal computer, which can send a natural image such as a photo between personal computers.

Figure 2:
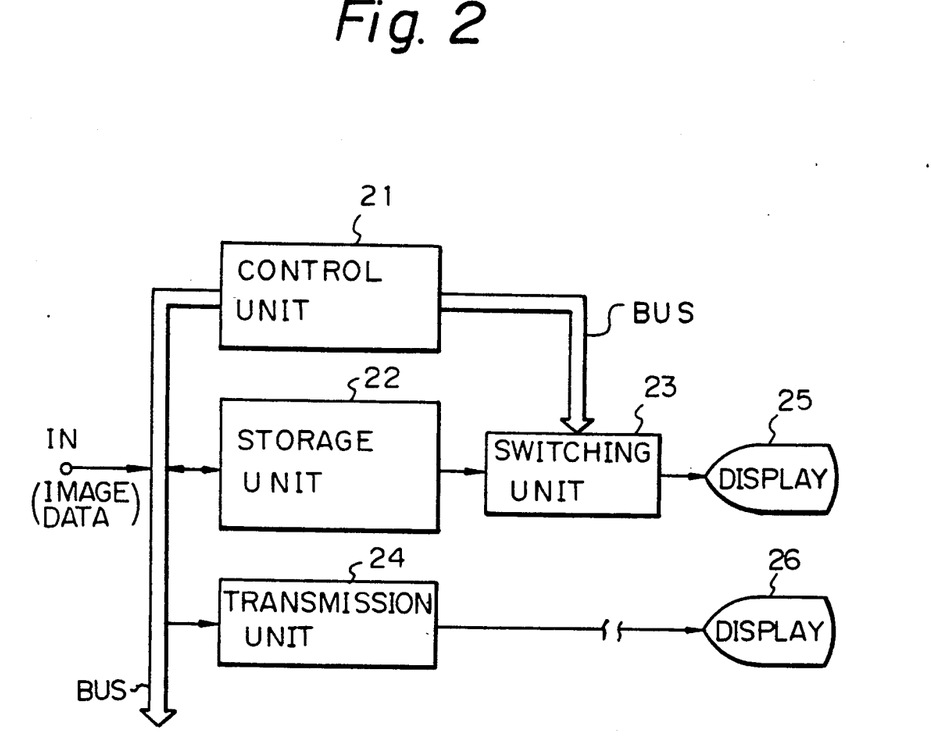
FIG. 2 is a schematic block diagram of a terminal apparatus with a transmission function according to the present invention.

FIG. 2 is a schematic block diagram of a terminal apparatus with a transmission function according to the present invention. In FIG. 2, reference number 21 denotes a control unit, 22 a storage unit, 23 a switching unit, 24 a transmission unit, and 25 a display unit. Reference number 26 denotes a display unit provided in another terminal apparatus. Accordingly, the terminal apparatus according to the present invention is constituted by the units 21 to 25.

As is obvious from the drawing, in the present invention, only one storage unit 22 is provided in common for storing the RGB data, luminance/color difference data and compression data. Further, the switching unit 23 is provided for switching the content of the display. The image data desired from the reception side is read out from the color scanner or the external storage device and stored in the storage unit 22 as the RGB data. The RGB data is displayed on the display unit 25 through the switching unit 23 to confirm the content of the image data. After confirmation, the RGB data is converted to the luminance/color difference data and stored in the same storage unit 22 after compression under the control of the control unit 21. The compression data obtained from the luminance/color difference data is transmitted to another terminal apparatus 26 through the transmission unit 24 under the control of the control unit 21. In this case, the control unit 21 functions to convert the RGB data to the luminance/color difference data, to compress the luminance/color difference data, to update the storage unit 22 from the RGB data to the luminance/color difference data, and to transmit the compressed luminance/color difference data to another terminal apparatus. Accordingly, since storage unit 22 can be used in common for storing the RGB data, the luminance/color difference data and the compression data, it is not necessary to provide a memory having large capacity so that memory capacity can be reduced.

Figure 3:
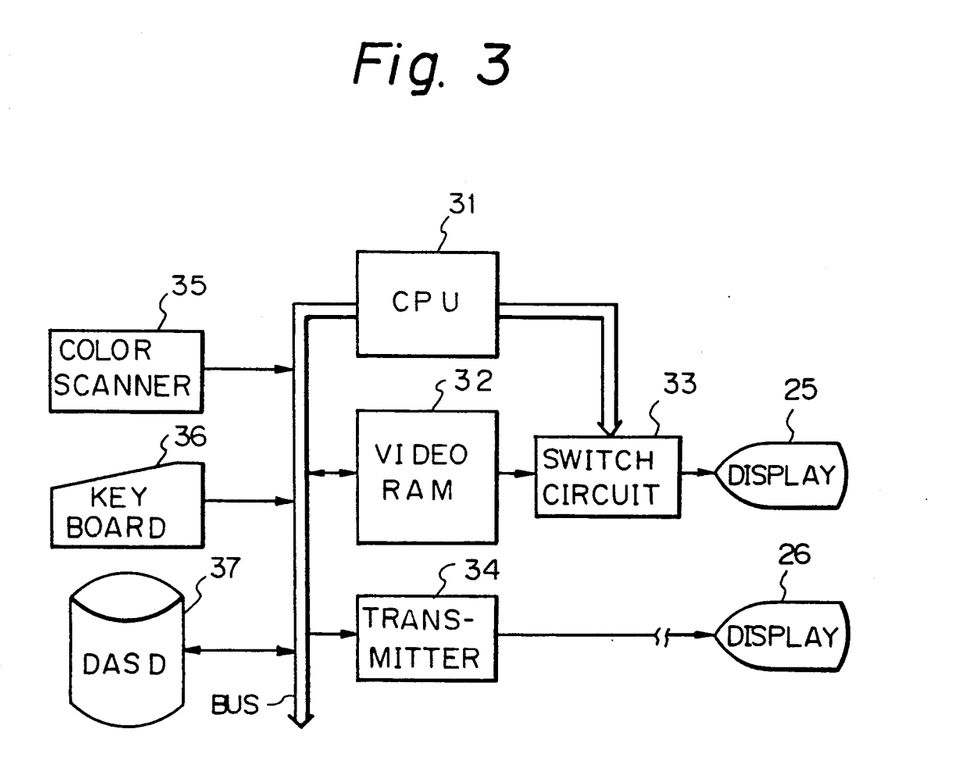
FIG. 3 is a schematic block diagram of a terminal apparatus according to an embodiment of the present invention.

FIG. 3 is a schematic block diagram of a terminal apparatus according to an embodiment of the present invention. In FIG. 3, reference number 31 denotes a central processing unit CPU as the control unit, 32 a video RAM (random access memory) as the storage unit, 33 a display switching circuit as the switching unit, and 34 a transmitter as the transmission unit. Further, reference number 35 denotes a color scanner, 36 a keyboard and 37 a disk memory DASD as the external storage unit.

The image data represented by the natural image, for example, the sales catalog required from the user, is scanned by the color scanner by operation of the keyboard at the transmission side. The scanned data is stored in the video RAM 32 as the RGB data. Further, the compression data thereof is also stored in the external memory DASD 37. The RGB data stored in the video RAM 32 is displayed on the display unit 25 through the switching unit 33 to confirm whether or not it correctly represents the desired image data. The RGB data is then converted to the luminance/color difference data and further converted to the compression data to raise the transmission efficiency. The detailed process is explained by a flowchart shown in FIGS. 5A to 5C.

Figure 4A:
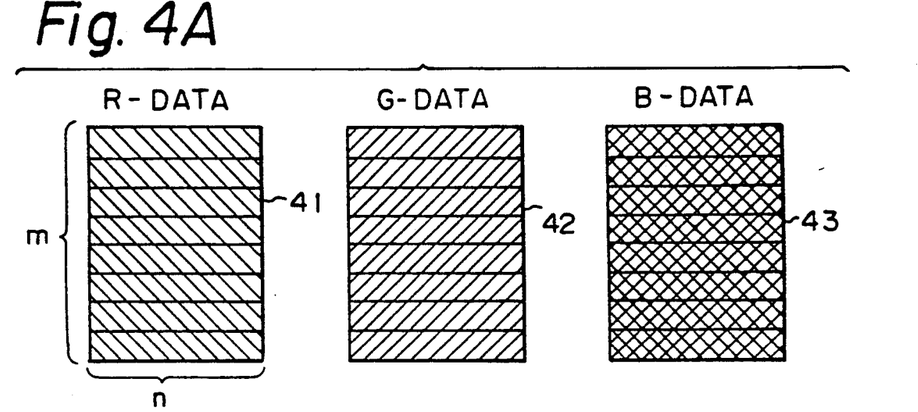
FIGS. 4A to 4C are views for explaining conversion steps from the RGB data to the compression data consisting of the luminance/color difference data.
Figure 4B:
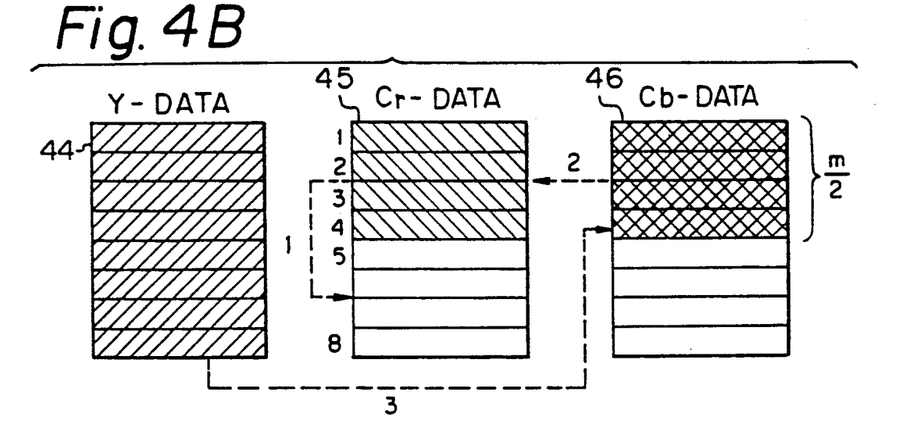
Figure 4C:
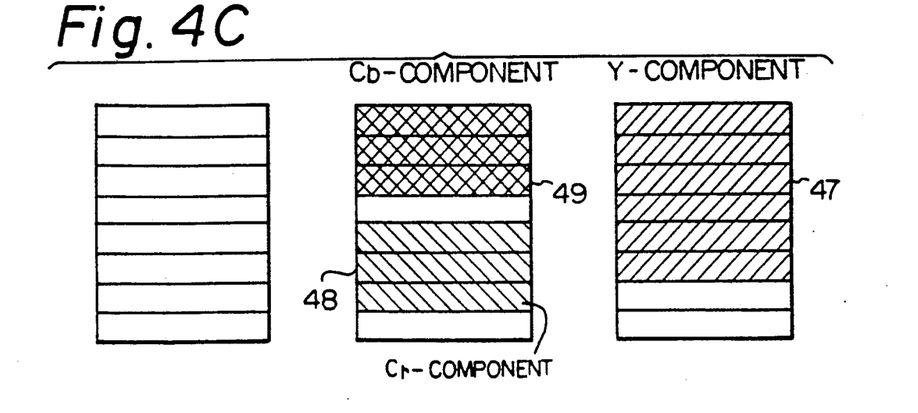

FIGS. 4A to 4C are views for explaining conversion steps from the RGB data to the compression data consisting of the luminance/color difference data. In FIG. 4A, reference number 41 denotes a R-memory storing R-data, 42 a G-memory storing G-data, and 43 a B-memory storing B-data. The video RAM 32 shown in FIG. 3 is expressed by three memory areas of R-, G-, and B-memories for simplifying the explanation. In FIG. 4B, reference number 44 denotes an area of the luminance data Y, 45 an area of the color difference data Cr, and 46 an area of the color difference data Cb. In FIG. 4C, reference number 47 denotes an area of the luminance data Y after compression, 48 an area of the color difference data Cr after compression, and 49 an area of the color difference data Cb after compression.

The RGB data is converted to the luminance/color difference data Y, Cb and Cr by using the conventional conversion formula. Further, the luminance/color difference data Y, Cb and Cr is converted to the compression data by using the conventional GBTC method. In the GBTC method, the image data is divided into a plurality of blocks each having $N \times N$ pixels, the gradation of the block is determined in accordance with the change rate of the gradation in the block, and the block is coded in accordance with the representative gradation value in that block.

FIG. 4A shows a storage configuration of the input image data as the RGB data in the video RAM. Under the control of the CPU 31, each line m of the RGB data is read out from the video RAM, and the read data is converted to the luminance data Y and the color difference data Cb and Cr, then the luminance data Y and the color difference data Cb and Cr are stored in the R-, G-, and B-areas of the just read-out RGB data.

FIG. 4B shows a storage configuration of the luminance data Y and the color difference data Cb and Cr in the video RAM 32 after above conversion. In this case, the color difference data Cb and Cr occupy half of each area as shown in FIG. 4B. Accordingly, the remaining halves of 45 and 46 are vacant. In the present invention, these vacant areas are utilized to obtained the compression data obtained from the luminance data Y and the color difference data Cb and Cr.

FIG. 4C shows a storage configuration of the compression data. As shown in FIG. 4B, first, the color difference data Cr is stored in the vacant space after being compressed from four lines to three lines. Second, the color difference data Cb is stored in the Cr data area already read out after being compressed from four lines to three lines. Finally, the luminance data Y is stored in the Cb data area which was already read out after being compressed from eight lines to five lines.

Accordingly, the storage configuration in the video RAM 32 is shown in FIG. 4C, and this compression data is transmitted to another terminal apparatus (reception side) through the transmitter 34. Further, this compression data is demodulated to the RGB data on the reception side and displayed on the display unit 26.

Figure 5A:
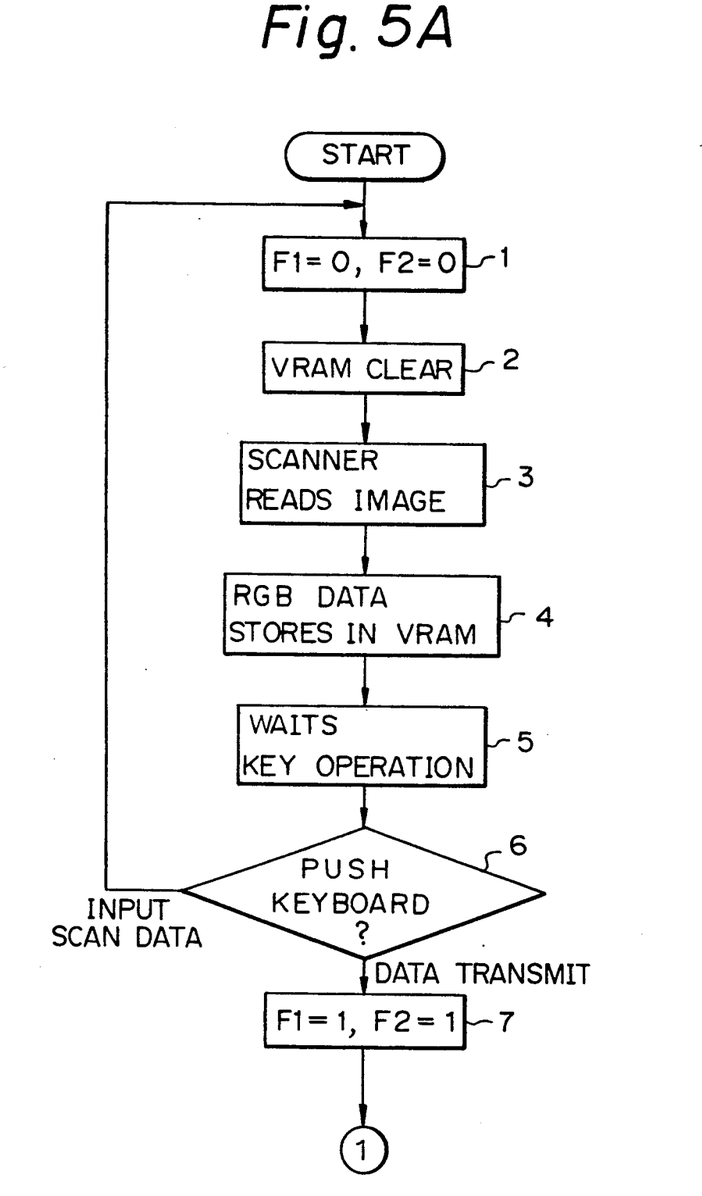
FIGS. 5A to 5C are basic flowcharts for explaining operation of a terminal apparatus shown in FIG. 3.
Figure 5B:
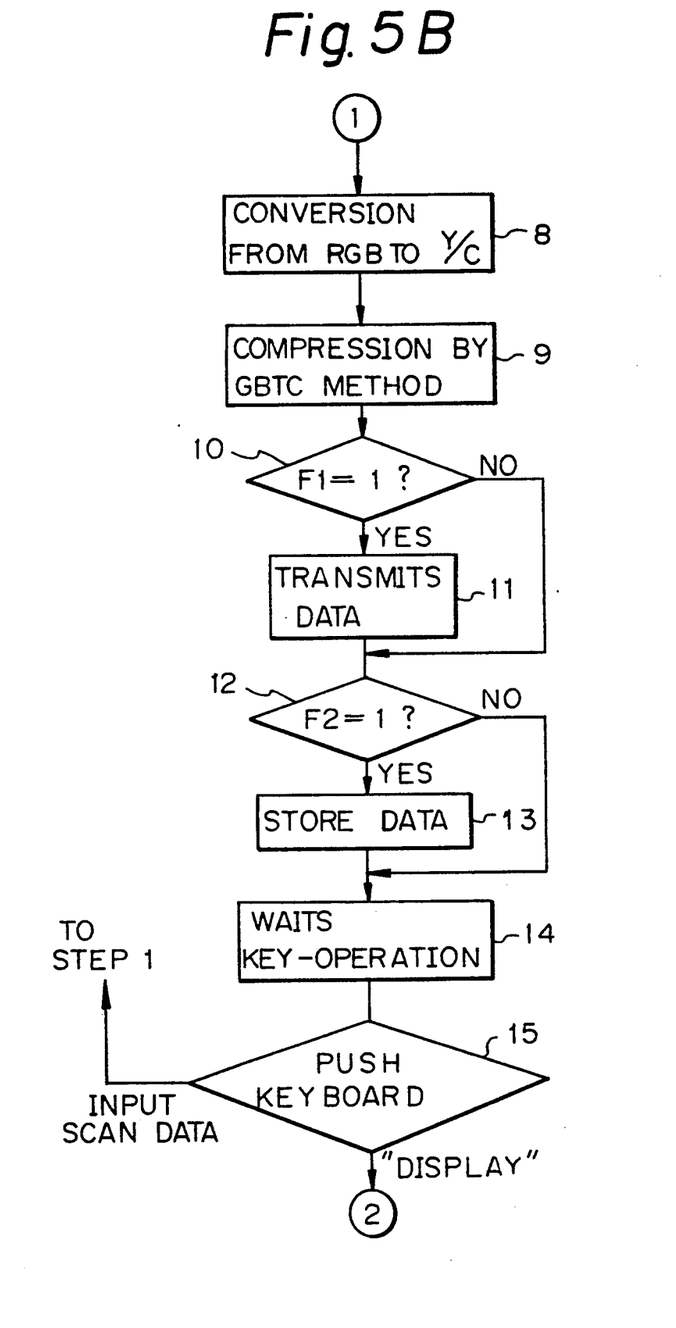
Figure 5C:
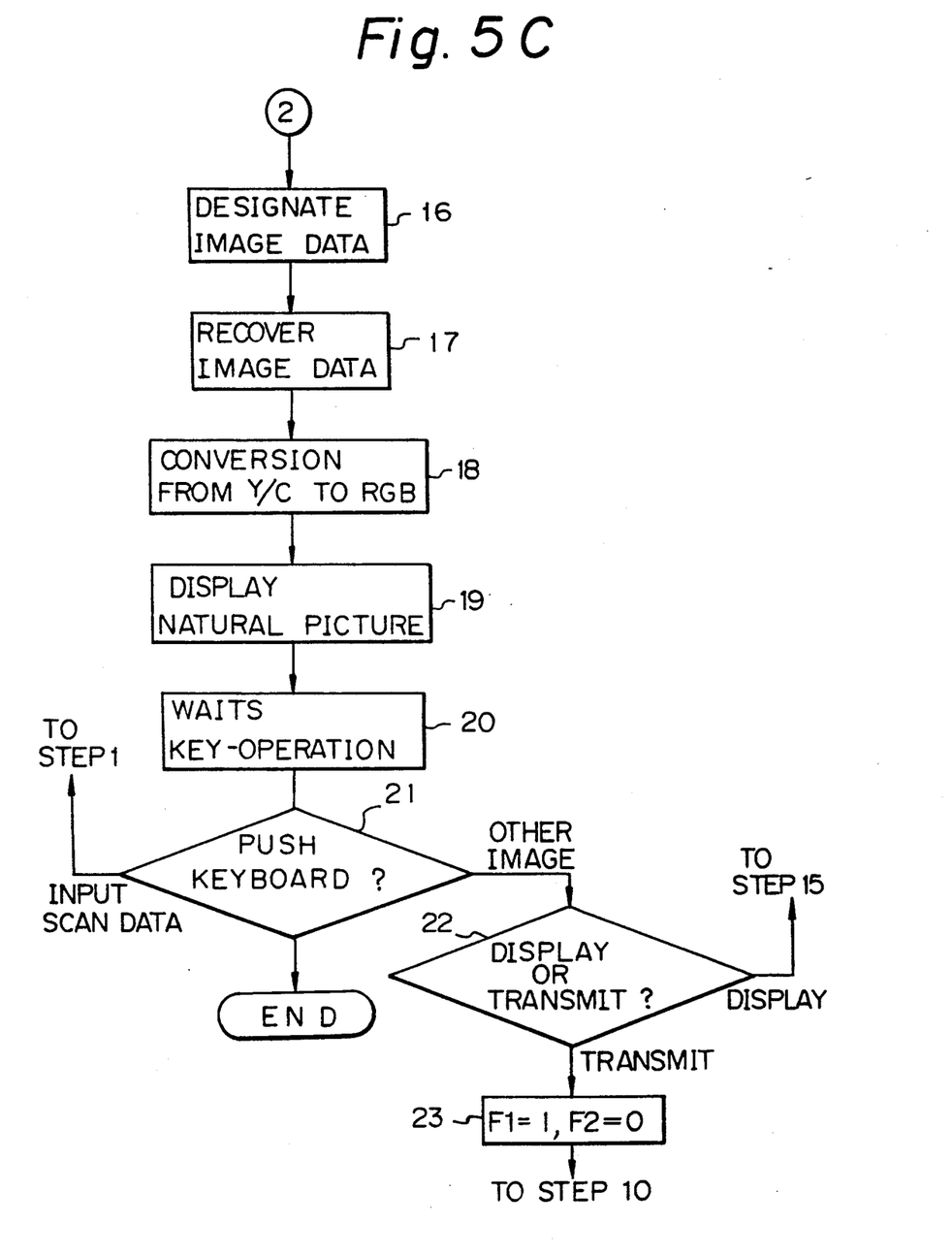

FIGS. 5A to 5C are basic flowcharts for explaining operation of a terminal apparatus shown in FIG. 3. In the initial state, a flag F1 indicating the data transmission and a flag F2 indicating the data storage are set to "0" (step 1), and the clear state of the video RAM is displayed on the display apparatus (step 2). When the color scanner 35 reads the original picture (step 3), the RGB data read from the scanner is stored in the video RAM (step 4). After displaying the RGB data on the display apparatus, the CPU 31 waits for a key-operation at the keyboard 36 (step 5). The CPU 31 judges whether or not the key-operation is performed (step 6). If a key-operation is not performed (INPUT SCAN DATA), the step returns to step 1 to continue the scanning operation. If a key-operation is performed (DATA TRANSMIT), the data transmission and storage operation are started. In this case, the data transmission flag F1 and the data store flag F2 are set to "1" (step 7). The scanned data (RGB data) is stored the video RAM 32 and the stored RGB data is converted to the luminance/color difference data (step 8). The luminance/color difference data is compressed in accordance with the GBTC method (step 9). The CPU 31 judges whether or not the flag F1 is set to "1" (step 10). When the flag F1 is "1" (YES), the compression data stored in the video RAM is transferred to another terminal 26 (step 11). Next, the CPU 31 judges whether or not the flag F2 is set to "1" (step 12). When the flag F2 is "1" (YES), the compression data is stored in the external memory 37 (step 13), and the CPU waits for the key-operation (step 14). Next, the CPU judges whether or not the key-operation is performed (step 15). When the "image display" is instructed by the key-operation (step 16), the designated image (compression data) is read out from the external memory 37 (step 17). The CPU converts the compression data to the RGB data (step 18) and the RGB data is displayed on the display apparatus for conformation of the content (step 19). Next, the CPU waits for the key-operation (step 20), and judges whether or not the key-operation is performed (step 21). When another image is required from another terminal (step 22), the data transmission flag F1 is set to "1" and the operation returns to the first step 1 (step 23).

Figure 6:
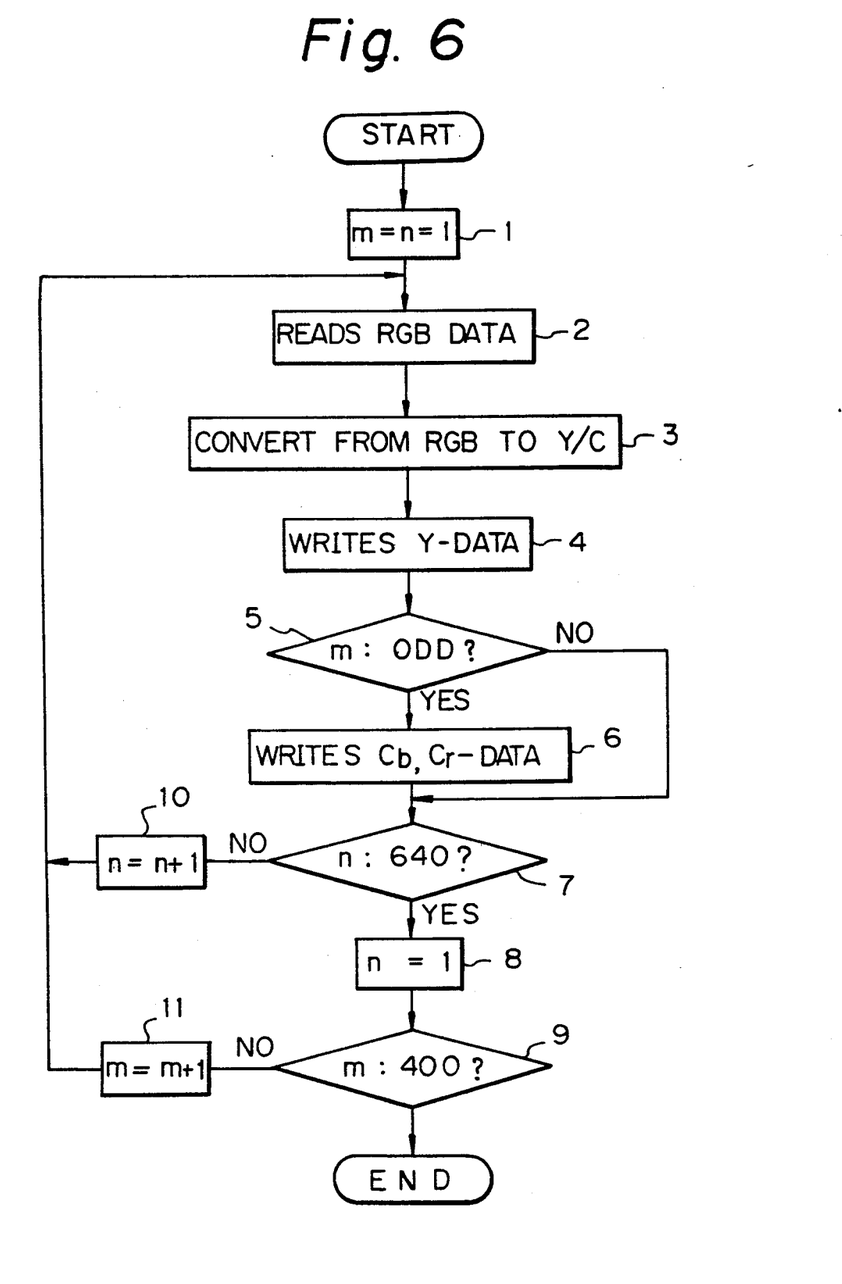
FIG. 6 is a detailed flowchart for explaining conversion from RGB data to luminance/color difference data shown in FIGS. 4A to 4C and shown by step 8 in FIG. 5B.

FIG. 6 is a detailed flowchart for explaining conversion from the RGB data to the luminance/color difference data shown in FIGS. 4A to 4B and shown by step 8 in FIG. 5B. In FIG. 6, in the initial state, the RGB data is already stored in the memory areas 41 to 43 as shown in FIG. 4A. In this step, the line number (m) and the dot number (n) of the memory area are set to "1" (step 1). Under the control of the CPU 31. The RGB data is read out from the video RAM (step 2) and converted to the luminance/color difference data (step 3). Next, the converted luminance data (Y) is written into the memory area 44 from "m" lines until "n" dots in FIG. 4B (step 4). The CPU judges whether or not the number of the lines "m" is odd (step 5). When "m" is odd (YES), the converted color difference data Cb and Cr is written into the memory areas 45 and 46 in FIG. 4B (step 6). In this case, the data is written from line 1 to (m+1)/2. When "m" is even, the data is written from 1 to m/2. Next, the CPU judges whether the number of dots "n" is 640 dots (step 7). When "n" is 640, the dot "n" is returned to "1" (step 8). Further, the CPU judges whether or not the number of lines "m" is 400 (step 9). When "m" is 400, the conversion and storage operation is completed. However, in steps 7 and 9, when "n" and "m" are "NO" (steps 10, 11), the procedure is again started from the step 2.

Figure 7:
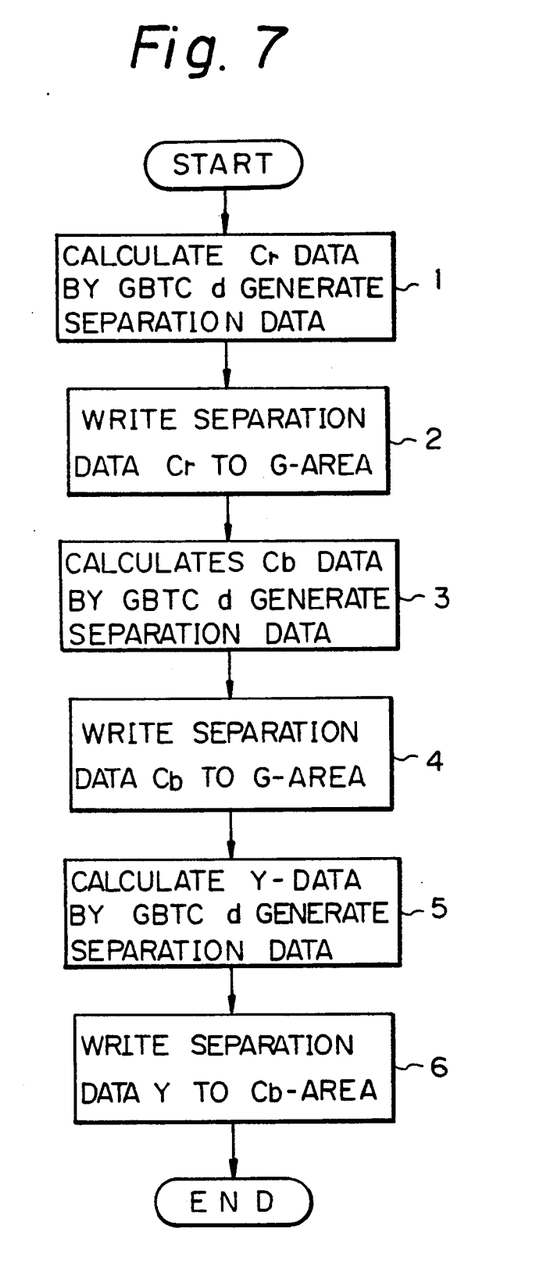
FIG. 7 is a detailed flowchart for explaining a compression of a luminance/color difference data shown in FIGS. 4A to 4C and shown by step 9 in FIG. 5B.

FIG. 7 is a detailed flowchart for explaining the compression of the luminance/color difference data shown in FIGS. 4B to 4C and shown by step 9 in FIG. 5B.

In step 1, the CPU performs the GBTC calculation regarding the color difference data Cr stored in the memory area 45 in FIG. 4B from line 1 to 4 (m=4) and obtains separation data La, Ld, $\phi1$ and $\phi2$. Where, for example, La and Ld=8000 bytes, and $\phi1$ and $\phi2$=16000 bytes.

In step 2, the above separation data is written into the area from 5 to 8 in the memory area 45 in FIG. 4B. That is, the data La is written into the area 5, the data Ld into the area 6, the data $\phi1$ into the area 7 and the data $\phi2$ into the area 8. One area contains 32 kbytes.

In step 3, the CPU performs the GBTC calculation regarding the color difference data Cb stored in the memory area 46 in FIG. 4B from line 1 to 4 (m=4) and obtains separation data La, Ld, $\phi1$ and $\phi2$. Where, for example, La and Ld=8000 bytes, and $\phi1$ and $\phi2$=16000 bytes.

In step 4, the above separation data is written into the vacant area from 1 to 4 in the memory area 45 in FIG. 4B. That is, the data La is written into the area 1, the data Ld into the area 2, the data $\phi1$ into the area 3 and the data $\phi2$ into the area 4. One area contains 32 kbytes.

In step 5, the CPU performs the GBTC calculation regarding the luminance data Y stored in the memory area 44 in FIG. 4B from line 1 to 8 (m=8) and obtains separation data La, Ld, $\phi1$, $\phi2$ and dij. Where, for example, La and Ld=16000 bytes, $\phi1$ and $\phi2$=32000 bytes, and dij=64000 bytes. Further, "dij" denotes the difference between the representative gradation value and the original image value.

In step 6, the above separation data is written into the vacant area from 1 to 8 in the memory area 46 in FIG. 4B. That is, the data La is written into the area 1, the data Ld into the area 2, the data $\phi1$ into the area 3 and the data $\phi2$ into the area 4, and the data dij into the areas 5 and 6.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

I claim:

1. A terminal apparatus for displaying a natural image on a display unit and sending said natural image to another terminal apparatus, comprising:

only one storage means for storing RGB data, luminance/color difference data and compression data, said RGB data being obtained by scanning said natural image, said luminance/color difference data being obtained by converting said RGB data, and compression data being obtained by compressing said luminance/color difference data under a predetermined method;

switching means operatively connected to said storage means for switching content of display on said display unit from said RGB data stored in said storage means to image data not stored in said storage means when said RGB data is converted to said luminance/color difference data and said luminance/color difference data is converted to said compression data; and control means operatively connected to said storage means and said switching means for reading out said RGB data from said storage means, converting said RGB data to said luminance/color difference data, storing said luminance/color difference data into said storage means, and compressing said luminance/color difference data to said compression data after read out from said storage means, further, for controlling switching operation of said switching means.

2. A terminal apparatus as claimed in claim 1, wherein said terminal apparatus further comprises transmission means operatively connected to said storage means and said control means for transmitting said compression data stored in said storage means to the another terminal apparatus under control of said control means.

3. A terminal apparatus as claimed in claim 2, wherein said apparatus further comprises bus lines operatively connecting said control means to said storage means, said switching means and said transmission means.

4. A terminal apparatus as claimed in claim 1, wherein said terminal apparatus further comprises an external storage means for storing a plurality of said compression data.

5. A terminal apparatus as claimed in claim 1, wherein said predetermined method is a GBTC (generalized block truncation) method.

6. A terminal apparatus as claimed in claim 1, wherein said storage means is a video RAM (random access memory).

7. A terminal apparatus as claimed in claim 1, wherein said control means is a microprocessor.

8. A terminal apparatus as claimed in claim 1, wherein said apparatus further comprises bus lines operatively connecting said control means to said storage means and said switching means.

* * * * *